March 1, 1966

I. D. PRESS 3,237,974

HOSE FITTING

Filed Feb. 10, 1965

INVENTOR
IRVING D. PRESS

BY
Byerly, Townsend, Watson & Churchill
ATTORNEYS.

March 1, 1966 — I. D. PRESS — 3,237,974
HOSE FITTING
Filed Feb. 10, 1965 — 3 Sheets-Sheet 2

INVENTOR
IRVING D. PRESS
BY
Byrly, Townsend, Watson & Churchill
ATTORNEYS.

March 1, 1966 I. D. PRESS 3,237,974
HOSE FITTING

Filed Feb. 10, 1965 3 Sheets-Sheet 3

INVENTOR
IRVING D. PRESS
BY
Byerly, Townsend, Watson & Churchill
ATTORNEYS.

United States Patent Office 3,237,974
Patented Mar. 1, 1966

3,237,974
HOSE FITTING
Irving D. Press, West Orange, N.J., assignor to Resistoflex Corporation, Roseland, N.J., a corporation of New York
Filed Feb. 10, 1965, Ser. No. 433,847
8 Claims. (Cl. 285—149)

This application is a continuation-in-part of our prior application Serial No. 133,415, filed August 23, 1961, and now abandoned.

The present invention relates to hose end fittings and more particularly to an improved arrangement in such fittings for obtaining and maintaining a fluid seal.

Fluid seals are developed in hose fittings generally by developing forceful engagement between fitting surfaces and the hose wall. Whatever the material of which the hose is constructed or the type of fitting involved (swaged or reuseable) the problem, although the reasons therefor will vary, remains the same—how does one consistently obtain the same reliable fluid seal in the hose-to-fitting joint?

Flexible hose are commonly classed as metallic and non-metallic. The present invention is concerned with hose having at least a lining portion of non-metallic material.

A material such as polytetrafluoroethylene (P.T.F.E.) which is subject to cold flow, is virtually incompressible in a volumetric sense, and is not readily deformable, poses certain difficulties. A brief discussion may help to understand what is involved.

A typical P.T.F.E. hose consists of a liner of the resin which is sheathed in a reinforcing armor of braided steel wire. The liner is made by an extrusion process and extreme care must be exercised in order to maintain the wall thickness uniform both circumferentially as well as longitudinally. The steel wire is then applied to the outside of the liner by braiding machinery. Although the strands of wire press into the surface of the liner no bonding occurs, but upon removal of the braid the surface of the liner will retain the impressions thereof.

Hose fittings can generally be classified as swaged or reuseable or a combination of both. In the swaged fitting metal sleeves are either contracted or expanded in telescoping relation to the end of a hose in order to develop sealing as well as anchoring pressure. In the reuseable type the parts are designed for use on a particular hose and are successively interfitted with the hose end. With the swaged type the parts can be arranged to make initially a sufficiently loose fit with the hose to permit easy assembly. However, with the reuseable type sealing pressure is obtained in the process of assembling the parts. Consequently, the amount of squeeze or compression has been limited in the past by practical consideration of the amount of force that could be tolerated for effecting the assembly.

Swaged fittings have been employed successfully in the past with P.T.F.E. hose but it has been necessary to control very carefully the wall thickness of the hose, the dimensions of the fitting parts, and the extent to which the fitting has been swaged or contracted. Only with such control is it possible to develop consistently the same amount of squeeze or compression on the hose for establishing a fluid seal.

In certain instances it has been preferred to use a reuseable type fitting. A number of such fittings have been developed for use on P.T.F.E. hose, and typical of these is the one disclosed in my issued Patent No. 2,853,-319. In this form of fitting a nipple barrel is inserted in the liner to expand the latter into tight engagement with a plurality of axially spaced annular ribs or barbs formed on an intermediate sleeve. If tolerances should run the wrong way it is possible to find that the nipple can be inserted in the hose only with difficulty, and there is a possibility of either tearing or forcing the liner out of the sleeve. Another and more significant problem arises from the nature of the fitting which dictates that a metal-to-metal seal must be established between the nipple and intermediate sleeve in order to take advantage of the so-called lip sealing action under high operating pressure. A satisfactory metal-to-metal seal requires costly machining operations and the like which render the fitting unattractive to manufacturers.

The present invention is founded on the principle of constructing the fitting parts in such a way that substantially all the sealing and gripping force is developed toward the very end of telescopic assembly thereof. In this way the parts can be interfitted with the hose and almost completely assembled without encountering appreciable resistance. Only during the final stages of assembly is resistance encountered and this is accommodated by the mechanical advantage built into the fitting. At the same time the construction of the fitting is such as to make the sealing grip virtually independent of the degree of assembly of the fitting components. This follows from the fact that the sealing grip is developed between coaxial cylindrical surfaces or the effective equivalent thereof. In addition, the nature of the fitting is such as to confine the end of the hose liner before appreciable force is exerted so that damage or displacement thereof is quite impossible.

As will appear from the following description, the invention gives rise to many advantages. It enables the metal-to-metal seals required in fittings such as described in my aforementioned patent to be eliminated. It provides a means for obtaining zones of extremely high compression or squeeze on a material such as P.T.F.E. or the like which does not deteriorate with aging and is not dependent upon adherance to extremely close tolerances; and the parts required to achieve the seal are easy to fabricate.

In accordance with the invention there is provided a hose end fitting for a hose having an outer portion and a lining portion, at least the lining portion being formed from a flexible resilient material, the fitting comprising when in assembled relationship: a tubular nipple having one end for insertion within the lining portion of the hose with an annular section for accomodating a radially inwardly directed flare at the end of the lining portion, the section including a plurality of axially spaced substantially cylindrical surfaces of progressively increasing diameter towards the one end of the nipple, and an opposite end extending therefrom; and a body member in the form of a sleeve having one end telescoping over the opposite end of the nipple and adapted to extend over the end of the lining portion but under the outer portion of the hose, the interior of the sleeve being provided with a zone in juxtaposition to the annular section of the nipple, the surface of the zone including axially spaced circumferential regions of progressively increasing diameter towards said one end of the sleeve complemental to the substantially cylindrical surfaces of the annular section of the nipple, and transitional surfaces joining adjacent ones of the circumferential regions, each transitional surface being everywhere greater in diameter than the circumferential region of lesser diameter with which it is contiguous and each sloping, at least where it borders a contiguous region of lesser diameter, for easing the sleeve over the end of the lining portion whereby the zone is arranged to flare radially inwardly and develop simultaneously a plurality of axially spaced annular regions of high squeeze upon the end of the lining portion, means for securing the sleeve to the opposite end of the nipple, and coupling means disposed at the other end of the sleeve.

The invention will be better understood after reading the following detailed description of several exemplary embodiments thereof with reference to the appended drawings in which:

FIGURE 6 is a fragmentary longitudinal sectional view of a reuseable type fitting embodying the invention;

Referring to FIGURES 1 to 3 the invention is shown as applied to a combined reuseable swaged fitting. The same reference numerals are used throughout to designate the same or similar parts.

Figure 1:
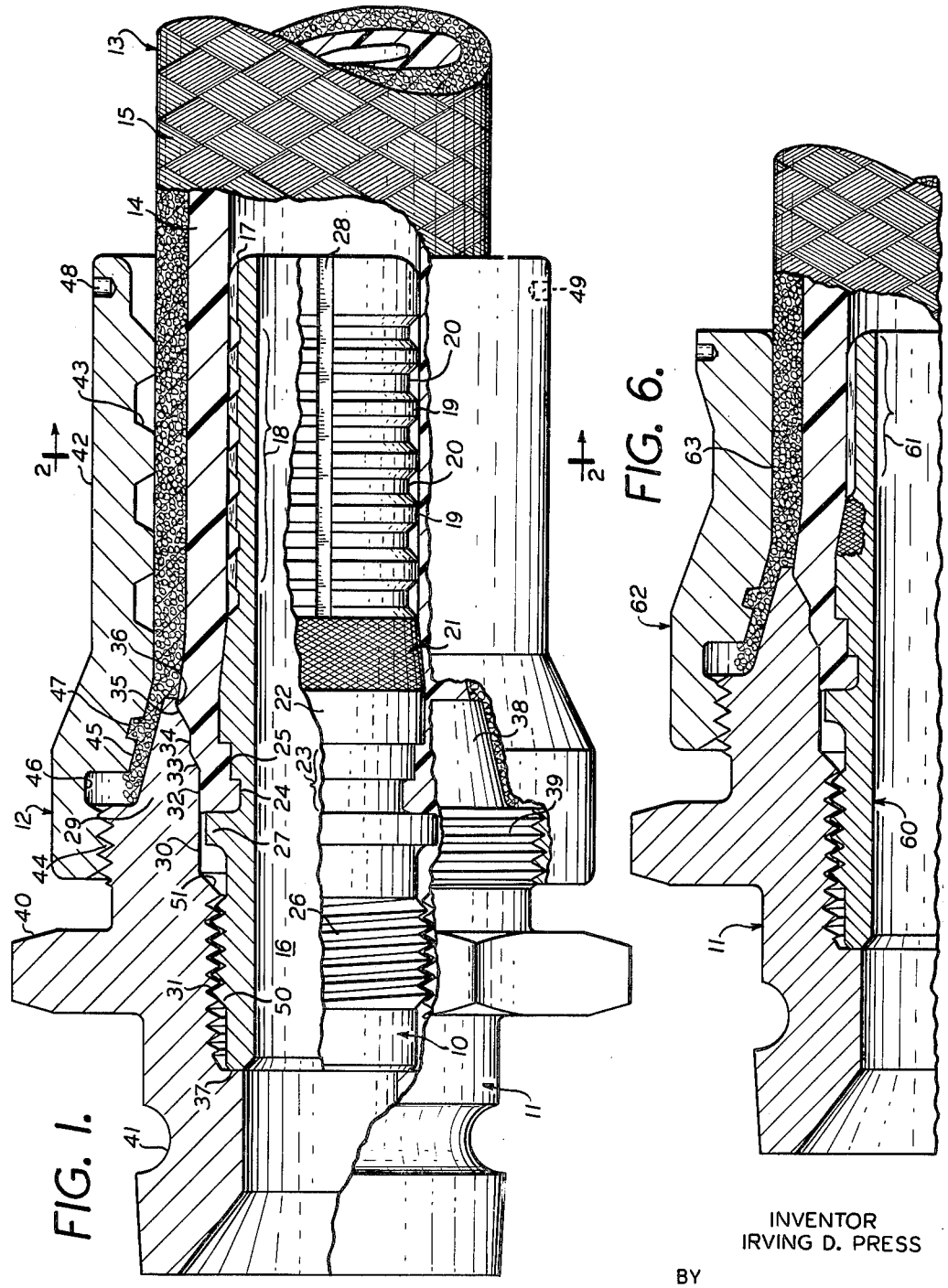
FIGURE 1 is a longitudinal view partly in section showing a combined reuseable swaged type of fitting embodying the invention as applied to a P.T.F.E. hose prior to swaging of the sockets.

The fitting consists of a nipple member 10, a body member 11, and a socket member 12, and is shown in different stages of assembly on a hose 13. The hose is composed of a P.T.F.E. liner 14 covered with a braided steel wire sheath 15.

The nipple 10 is tubular having a through fluid passage or bore 16. One end, for entry in the end of the hose liner 14, has a nose which is rounded at 17 followed by a section or region 18 provided with a plurality of alternating annular ribs 19 and annular grooves 20. Adjacent the grooved section 18 is a knurled tapered area 21 connecting with a cylindrical portion 22 of somewhat larger diameter than the diameter of the ribs 19. Immediately adjacent the enlarged area 22 is an annular portion or channel 23 including a plurality of axially spaced substantially cylindrical surfaces 24 and 25 of progressively increasing diameter in the direction facing the hose or enlarged portion 22. It will be observed that the surfaces 24 and 25 are arranged step-like in cooperation with the area 22.

The opposite end of the nipple is provided with an externally threaded portion 26 and an enlarged shoulder 27, the latter being located adjacent the channel 23. A plurality of circumferentially spaced longitudinal grooves 28 (best seen in FIGURE 2) extend along the grooved section of the nipple to the nose for a reason to be explained later on.

The body member 11 is in the form of a sleeve having an end 29 for insertion between the hose sheath 15 and the hose liner 14, telescoping over the end of the nipple 10. A counterbore 30 is formed in the end 29 of the sleeve and terminates within the sleeve in a threaded section 31. As shown, the counterbore has a flared entrance composed of alternating cylindrical and frusto-conical surfaces, 32, 33, 34, 35 and 36 respectively, joined step-like. The counterbore 30 terminates in a shoulder 37. The outer surface of the end 29 of the body member is tapered at 38 and threaded at 39. Wrench flats 40 are provided for receiving a wrench to grip or rotate the body member. The opposite end of the body member is shown formed in conventional manner with a groove 41 for anchoring a swivel nut (not shown) thereby providing a standard female coupling arrangement.

The socket member 12 has initially a cylindrical portion 42 at one end provided on its interior with a ribbed surface 43 which may be a large coarse acme type thread. The other end of the socket is also cylindrical but of larger diameter and provided with internal threads 44. Between the threads 44 and the ribbed surface 43 is a tapered surface 45, an undercut relief area 46, and, if desired, an annular groove 47 in the tapered surface 45. Sockets 48 and 49 may be provided in the outer surface for receiving a spanner wrench.

After the end of the hose is cut square, the socket 12 is slipped over the hose and temporarily slid out of the way. The nipple 10 is then inserted until the hose liner 14 abuts the shoulder 27. Since the diameter of the ribbed portion 18 of the nipple approximates the internal diameter of the hose, insertion of the nipple is comparatively easy. Furthermore, with the exterior of the hose unconfined it will be found that the hose expands without too much resistance to pass over the enlarged area 22. The purpose of this enlarged area is to afford ample depth for the steps in the channel 23 without requiring reduction in diameter of the nipple bore 16.

A strap clamp, pliers or other convenient tool such as a split clamp in a vise is now applied to the hose where it overlies the ribbed area 18 so as to contract the hose. By reason of both the knurled surface 21 and the longitudinal grooves 28, relatively light pressure will develop sufficient interaction to prevent relative rotation between the nipple and hose while the two are so clamped. The body member 11 is now telescoped over the exposed end of the nipple. It will be observed that the threads on the nipple do not extend all the way to the end. Consequently, the internal threads 31 on the body member need not be formed perfectly all the way in to the shoulder 37. However, the location of the lead thread 50 on the nipple and the lead thread 51 on the body member can be chosen if desired so that they engage before the end 29 of the body member enters between the lining and sheath of the hose. This ensures good mechanical advantage when resistance is encountered ultimately; however, it should be understood that it is not in the least critical, particularly in view of the ease of assembly afforded by the novel construction.

With the aid of a suitable wrench applied to flats 40 the body member 11 is threaded onto the nipple 10. The action is quite free as will be evident from an examination of FIGURE 4. Due to the nature of the complemental steps on both the nipple and body member the latter will only be required to deflect or reversely flare the hose liner 14 without exercising any appreciable compressive forces thereon until assembly progresses beyond the stage shown in FIGURE 5.

For convenience, the radial distances between opposing surfaces of the complemental steps are tabulated below with respect to the wall thickness of the hose liner. The numbers in the columns correspond to the reference numerals designating the various surfaces.

| Equal or greater than the hose wall: | | Less than the hose wall: | |
|---|---|---|---|
| 36–22 | 34–25 | 34–22 | 32–25 |
| 36–25 | 32–24 | | |
| 36–24 | 34–24 | | |

For example, based upon a hose liner having a wall .040″ thick a distance interpreted as less than the thickness of the liner or hose wall may represent a gap which is about .014″ to .015″ less than the liner wall.

Consequently, it is not until the junction between surfaces 34 and 35 approaches the plane of the radial wall joining surfaces 25 and 22 (see FIGURE 5) that a close fit is encountered. No real compression is developed nor is any appreciable resistance encountered before surface 34 starts overriding surface 22. By proper choice of the lead for the threads 26 and 31 with respect to the extent of overlap of surfaces 32 and 34 relative, respectively, to surfaces 25 and 22 in the completed assembly, such overlap can be accomplished during the last half turn or so of the body member 11 on the nipple 10. In the foregoing example, an overlap of the order of .015″ was contemplated.

Figures 2, 3, 4, 5:
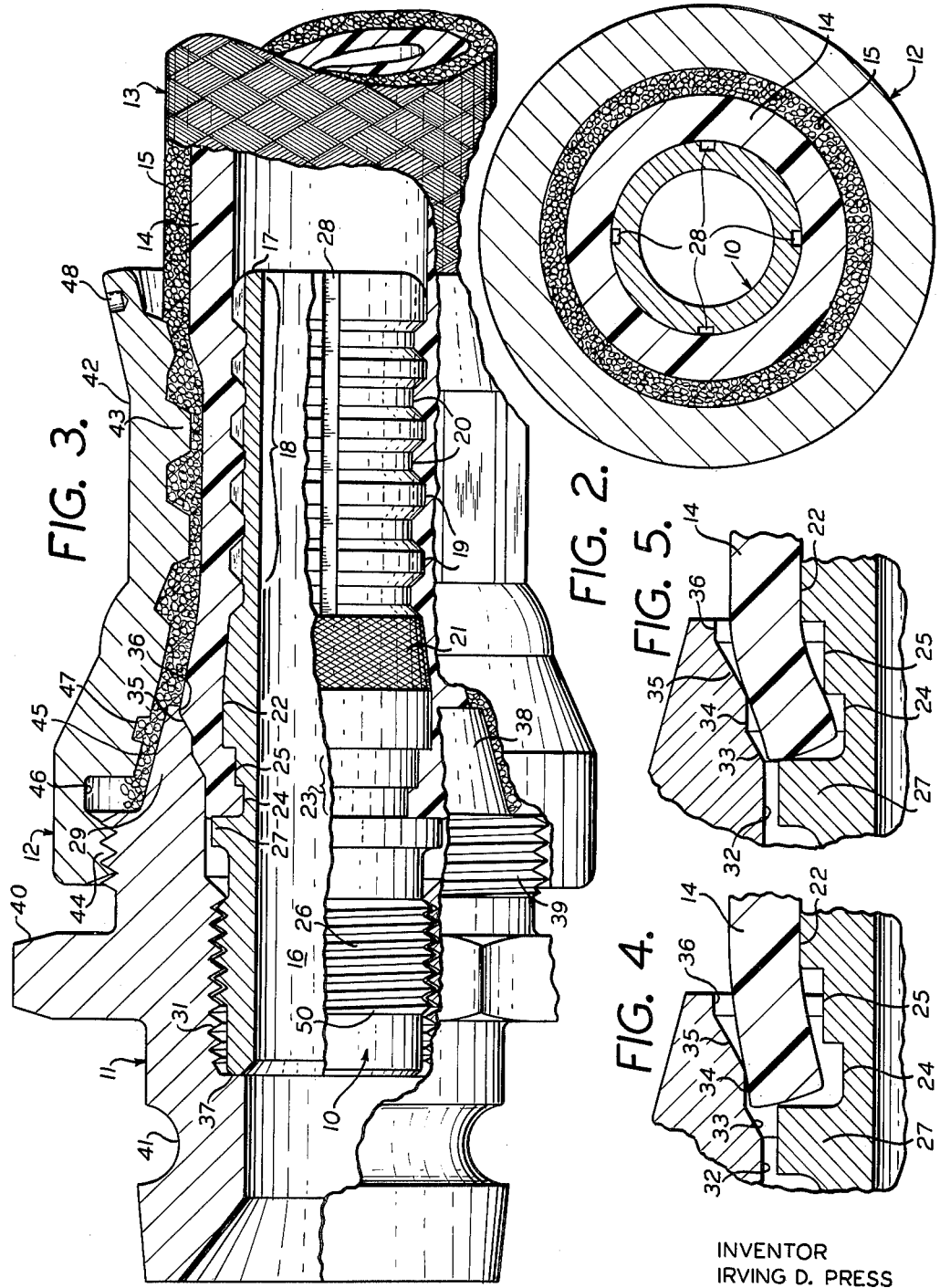
FIGURE 2 is a cross-sectional view taken along line 2—2 of FIGURE 1.
FIGURE 3 is a view similar to FIGURE 1 showing the same fitting after swaging.
FIGURES 4 and 5 are enlarged fragmentary sectional views showing the complementally stepped portions of the nipple and body components of FIGURE 1 in two different degrees of assembly.

From the sequence illustrated in FIGURES 4 and 5 it should be appreciated that the end of the hose liner is trapped on the steps of the nipple before any appreciable axial force is developed by the body member on such liner. Consequently, there is no danger of displacing the hose from the nipple. This represents one of the important advantages of the present invention. The conical surfaces 33 and 35 on the member (here the body member) which overrides the hose liner contribute toward this desirable result.

Final positioning of the body member 11 will be indicated when its shoulder 37 encounters the end of the nipple. Now the clamping device can be removed from about the hose. If other than a straight fitting is being assembled (e.g., an elbow might be interposed between the groove 41 and wrench flats 40 on the body member) the body member and nipple can be rotated as a unit relative to the hose for proper orientation. It has been found that such rotation is permitted by and has no noticeable adverse effect upon the grip on the end of the hose liner by the complemental stepped surfaces.

Now the fitting socket 12 can be returned to engage its threads 44 with the threads 39 on the body member. With the aid of a spanner wrench in the wrench sockets 48 and 49 the fitting socket 12 can be tightened until the wire braid 15 of the hose is securely gripped between the tapered surfaces 45 and 38. This is followed by swaging or contracting the portion 42 of the socket 12 as best seen in FIGURE 3. Radial swaging dies are convenient for this purpose.

With the foregoing embodiment the swaged portion of the fitting functions primarily to anchor the fitting on the hose and to prevent blow-off. Fluid sealing occurs primarily in the annular compartment bounded by the complementally stepped walls. Together, the nipple 10 and socket 12 provide an annular chamber for receiving the end of the hose, and the annular compartment is formed therein. It should be apparent that both the body member and nipple are reuseable although the socket is not.

Where complete reuseability of all the fitting parts are desired the fitting can be modified as shown in FIGURE 6. The body member may be identical with the one shown in FIGURE 1 and is, therefore, designated by the same reference numeral 11. The nipple 60 differs from nipple 10 only in the region 61 which is free from the annular ribs and grooves, and is somewhat shorter in length. Similarly, the socket 62 is somewhat shorter and has a smooth inner surface at 63 as well as having a diameter such as to develop slight compression or squeeze on the hose where it extends beyond the end of the body member. The method of assembly is substantially the same as that previously described with the omission of the swaging operation. It should be apparent that in this fitting the grip on the braid between the socket 62 and the body member 11 serves to anchor the fitting to the hose.

Figure 7:
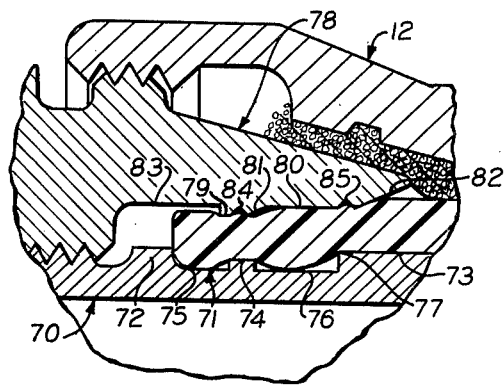
FIGURE 7 is an enlarged fragmentary sectional view of the complementally stepped portions of a modified form of fitting otherwise similar to FIGURE 1.

A modification of the complemental step region of the fittings of FIGURES 1 to 6 is illustrated in FIGURE 7. It can be assumed that the remainder of the fitting is the same as that already described.

With hose of extremely small diameter on the order of size dash 3 (nominal diameter of ³⁄₁₆″) it may be found that the rigidity of the liner is such as to make it difficult to assemble with the complemental steps of FIGURE 1. In such case the configuration shown in FIGURE 7 will prove advantageous. The nipple 70 is provided with an annular channel or recess 71 disposed between the shoulder 72 and the cylindrical surface 73 of enlarged diameter. Stepped down from the surface 73 is surface 74 followed by a further step down to surface 75. This much is virtually the same as shown in FIGURE 1. However, in FIGURE 7 an additional relief area or channel 76 is located between surfaces 73 and 74. Although the risers of the steps are scaled down generally speaking as the diameter or size of the fitting is reduced, the additional channel 76 provides a substantial drop from surface 73 thereby ensuring that the hose liner "hangs up" on the edge 77 during installation of the body member. At the same time the hose liner will have additional room to bulge when displaced from the regions of high compression. This condition is exaggerated in the enlarged view of FIGURE 7 for the purpose of illustration.

The body member 78 is provided with stepped cylindrical surfaces 79 and 80 joined by conical surface 81. An additional conical surface 82 is located at the mouth of the counterbore. Aside from slightly different proportioning the body member 78 resembles the body member 11 of FIGURE 1 with two exceptions. Member 78 is provided with an undercut channel 83 for still further relief, while the stepped surfaces 79 and 80 provided with annular V-shaped grooves 84 and 85. The channel 83 provides for bulging of the hose liner while the grooves 84 and 85 ensure good contact with the surface of the hose liner in spite of the braid marks mentioned previously. Again, this is a problem which seems significant only with the very small size fittings. Of course, the V-grooves may be omitted under appropriate circumstances.

The socket employed in FIGURE 7 may be the same as that shown in FIGURES 1 to 6. It will be found that upon swaging the socket additional resin material from the hose liner will be forced or packed into the space between the complemental steps. It should be understood that a similar condition will prevail with the FIGURE 1 embodiment.

By way of illustration the radial gap or distance between surfaces in FIGURE 7 are tabulated below in the same manner as previously for FIGURE 1.

| Equal or greater than hose wall: | Less than hose wall: |
|---|---|
| 80–76 79–75 | 80–73 79–74 |
| 80–74 83–75 | |

The complemental step seal employed in the fittings of FIGURES 1 to 7, by developing axially spaced zones of high compression toward the end of the assembly operation, represents a marked improvement over the sealing arrangements heretofore known and employed. Still further improvement and control can be attained by utilizing a modified configuration of the step seal as shown in FIGURES 8 and 9.

It was mentioned above that the extent of overlap contemplated in the embodiment of FIGURE 1 of the cooperating cylindrical surfaces on the body member relative to those on the nipple was of the order of .015″. However, the actual overlap in practice is affected by manufacturing tolerances which determine the relative location of the shoulder 37 on the body member and the location of the surfaces 24 and 25 on the nipple relative to the end of the nipple. It has been found that as the overlap area varies, the unit loading on the lining portion of the hose appears to vary and with this the quality of the seal. This problem is avoided by the modifications shown in FIGURES 8 and 9.

Figure 8:
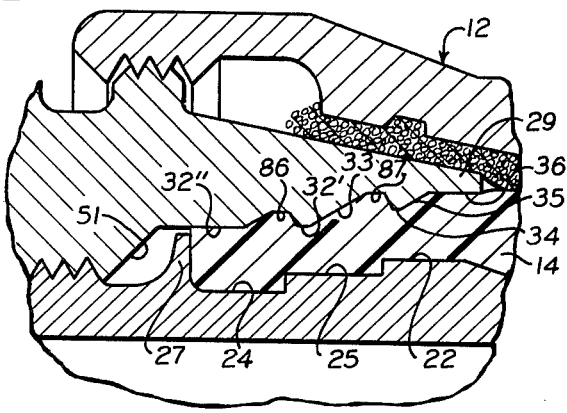
FIGURES 8 and 9 are views similar to FIGURE 7 showing two further modifications of the complementally stepped portions of the fitting.
Figure 9:
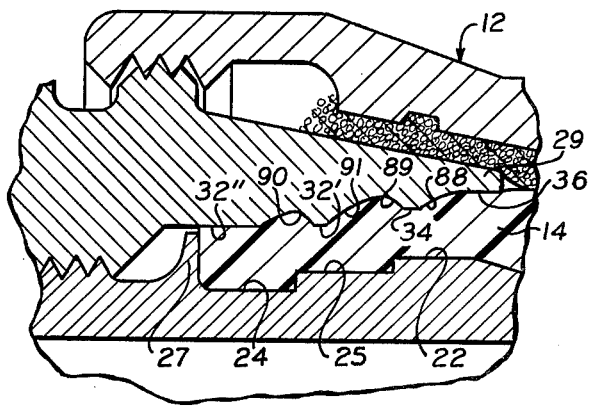

Turning now to FIGURE 8, it can be assumed that the fitting is identical in all respects to that shown in FIGURE 1 or FIGURE 6 except for the configuration of the inner surface of the body member in the step seal region. For convenience, it has been assumed to resemble the FIGURE 1 embodiment and the appropriate reference characters have been applied accordingly.

As with the previously described embodiments, the sleeve in FIGURE 8 is shown provided with a zone in juxtaposition to the surfaces 22, 24, and 25 of the nipple which zone has a surface including the axially spaced circumferential regions 32′ and 34 of progressively increasing diameter towards the end 29 of the sleeve complemental to the surfaces 25 and 22 of the nipple. However, an annular groove or relief is provided at 86 and 87 behind the regions 32' and 34, respectively, reducing the surface 34 to the short section shown and dividing the surface which was designated 32 in FIGURE 1, into the separated land areas 32' and 32".

Thus, a transitional surface is provided joining the adjacent surfaces or regions 32' and 34 which is everywhere greater in diameter than the region 32' of lesser diameter with which it is contiguous. At the same time the transitional surface, by including the frusto-conical surface 33, slopes where it borders the contiguous region 32' of lesser diameter for easing the sleeve over the end of the lining portion 14 of the hose. The sloping or frusto-conical surface 35 performs a similar function.

It will be observed that by reason of the grooves 86 and 87, the surfaces 32' and 34 have been foreshortened until their entire area is effective in developing the high squeeze regions. Not only does this increase the unit loading under each such surface, it being assumed that all other variables remain constant, but appreciable change in overlapping relationship between sleeve and nipple can be tolerated without altering the area of the high compression regions.

While the embodiment illustrated in FIGURE 8 employs alternating cylindrical and frusto-conical surfaces, it should be apparent that this is not essential. Instead, the transitional surfaces between the regions 32' and 34 as well as the surfaces to either side may be of curved form such as shown in FIGURE 9. Thus, a gradually curved surface 88 joins region 34 to surface 36, and a convenient curve provides the grooves or recesses at 89 and 90 and the sloping surface at 91.

It will be understood that the surfaces 88 and 91 may be varied in shape so long as they provide the necessary sloping surface for easing the sleeve over the lining portion 14 of the hose. At the same time the surfaces to the other side of the regions 32' and 34 can take most any form so long as an adequate relief is provided to increase the unit loading in the vicinity of regions 32' and 34.

However, it has been found from experience that excessive loading can, under aging conditions, result in cracks forming in the lining portion of the hose. To avoid this and to obtain a greater degree of control it is presently preferred to retain a cylindrical surface, albeit of negligible length, at the location of regions 32' and 34. By way of example, the axial length of surfaces 32' and 34 may be about .004".

It should now be apparent that in all of the fittings described above the complemental step seal enables the coupling part of the fitting to be formed integral with the body member. In this manner, the need for a metal-to-metal seal between body member and nipple is no longer necessary. Any fluid passing between the parts either returns to the main fluid body or is blocked by the complemental step seal.

From the foregoing description it should be evident that the invention provides the means for getting a relatively thin section of hose wall into a narrow cavity or compartment wherein it is placed under high compression without resort to swaging or similar deformation of fitting parts. The principles of the invention, i.e., the use of complemental steps, are applicable in numerous different situations of which only a few have been described in detail for illustrative reasons. Experience with actual fittings constructed along the lines described herein has revealed that the fluid seals obtained exceed all expectations. The seals are able to withstand higher pressures, they do not fail upon aging, and they are consistent in performance.

It is believed that the invention has now been described with sufficient detail to enable one skilled in the particular art to practice same. Various changes can be made in the specific structure without departing from the true spirit of the invention as defined in the appended claims.

What is claimed is:

1. A hose fitting for a hose of the type having a liner of substantially incompressible plastic material subject to cold flow and reinforced with a braided wire sheath, said fitting comprising when in assembled relationship: a tubular nipple having one end for insertion within the liner of said hose with an annular portion for accommodating a radially inwardly directed flare at the end of said liner, said portion including a plurality of axially spaced substantially cylindrical surfaces of progressively increasing diameter towards said one end of the nipple, adjacent cylindrical surfaces on said nipple being joined by substantially radial surfaces, and an opposite end extending therefrom; a body member in the form of a sleeve having one end telescoping over said opposite end of the nipple and adapted to extend over the end of said liner but under the end of said sheath, the interior of said sleeve being provided with a zone including a plurality of axially spaced substantially cylindrical surfaces of progressively increasing diameter towards said one end of the sleeve complemental to the substantially cylindrical surfaces of said annular portion of the nipple and arranged when the sleeve and nipple are assembled to flare radially inwardly and develop simultaneously a plurality of axially spaced annular regions of high squeeze upon the end of said liner, adjacent ones of said cylindrical surfaces on said sleeve being joined by radially inwardly directed frusto-conical surfaces, means for securing said sleeve to said opposite end of the nipple, and coupling means disposed at the other end of said sleeve; and a socket member adapted to surround said sheath and having one end in telescoping engagement with said body member and another end overlying the said one end of the nipple, said socket member being arranged to cooperate with said nipple and said sleeve for securing the fitting to the end of the hose.

2. A hose fitting according to claim 1, wherein the outer surface of the end of the nipple insertable within the liner is provided with irregular surface means to resist rotation of said nipple relative to said hose when said hose is forcefully contracted about said nipple.

3. A hose fitting for a hose of the type having a flexible resilient liner reinforced with a braided wire sheath, said fitting comprising when in assembled relationship: a body member in the form of a sleeve having one end for insertion between the sheath and the liner at one end thereof, a counterbore formed in said one end of the sleeve and terminating within said sleeve in a threaded section, said counterbore having a flared entrance composed of alternating cylindrical and frusto-conical radially inwardly directed surfaces joined step-like, and coupling means disposed at the other end of said sleeve; a tubular nipple having one end entering the counterbore of said body member and provided with an externally threaded portion in threaded engagement with the threaded section of said body member, entry of said nipple into said counterbore being limited by the depth of the latter, an annular channel formed in the outer surface of said nipple so as to be positioned generally opposite the flared entrance to said counterbore when the nipple and body member are fully assembled, said channel having a stepped cross-section axially of the nipple which is operatively complemental to the step-like surfaces of said entrance to the counterbore so as to provide axially spaced constricted zones for the liner of said hose, and an opposite end which extends beyond the end of said body member for insertion within the liner of said hose, the radial dimensions of said channel and adjacent surfaces of said nipple being proportioned along with those of said counterbore and flared entrance so as to provide an annular cavity for receiving the end of the hose liner in a squeezing grip with axially spaced annular regions of high squeeze; and socket means adapted to surround said sheath and having one end in telescoping engagement with said body member and another end overlying the said opposite end of the nipple for compressing the hose therebetween.

4. A hose end fitting for a hose having an outer portion and a lining portion, at least the lining portion being formed from a flexible resilient material, said fitting comprising when in assembled relationship: a tubular nipple having one end for insertion within the lining portion of said hose with an annular section for accommodating a radially inwardly directed flare at the end of said lining portion, said section including a plurality of axially spaced substantially cylindrical surfaces of progressively increasing diameter towards said one end of the nipple, and an opposite end extending therefrom; and a body member in the form of a sleeve having one end telescoping over said opposite end of the nipple and adapted to extend over the end of said lining portion but under said outer portion of said hose, the interior of said sleeve being provided with a zone including a plurality of axially spaced substantially cylindrical surfaces of progressively increasing diameter towards said one end of the sleeve complemental to the substantially cylindrical surfaces of said annular section of the nipple and arranged when the sleeve and nipple are assembled to flare radially inwardly and develop simultaneously a plurality of axially spaced annular regions of high squeeze upon the end of said lining portion, adjacent ones of said cylindrical surfaces on said sleeve being joined by frusto-conical surfaces, means for securing said sleeve to said opposite end of the nipple, and coupling means disposed at the other end of said sleeve.

5. A hose end fitting for a hose having an outer portion and a lining portion, at least the lining portion being formed from a flexible resilient material, said fitting comprising when in assembled relationship: a tubular nipple having one end for insertion within the lining portion of said hose with an annular section for accommodating a radially inwardly directed flare at the end of said lining portion, said section including a plurality of axially spaced substantially cylindrical surfaces of progressively increasing diameter towards said one end of the nipple, and an opposite end extending therefrom; and a body member in the form of a sleeve having one end telescoping over said opposite end of the nipple and adapted to extend over the end of said lining portion but under said outer portion of said hose, the interior of said sleeve being provided with a zone in juxtaposition to said annular section of the nipple, the surface of said zone including axially spaced circumferential regions of progressively increasing diameter towards said one end of the sleeve complemental to the substantially cylindrical surfaces of said annular section of the nipple, and transitional surfaces joining adjacent ones of said circumferential regions, each transitional surface being everywhere greater in diameter than the circumferential region of lesser diameter with which it is contiguous and each sloping, at least where it borders a contiguous region of lesser diameter, for easing the sleeve over the end of said lining portion whereby said zone is arranged to flare radially inwardly and develop simultaneously a plurality of axially spaced annular regions of high squeeze upon the end of said lining portion, means for securing said sleeve to said opposite end of the nipple, and coupling means disposed at the other end of said sleeve.

6. A hose end fitting for a hose having an outer portion and a lining portion, at least the lining portion being formed from a flexible resilient material, said fitting comprising when in assembled relationship: a tubular nipple having one end for insertion within the lining portion of said hose with an annular section for accommodating a radially inwardly directed flare at the end of said lining portion, said section including a plurality of axially spaced substantially cylindrical surfaces of progressively increasing diameter towards said one end of the nipple, adjacent cylindrical surfaces on said nipple being joined by substantially radial surfaces, and an opposite end extending therefrom; and a body member in the form of a sleeve having one end telescoping over said opposite end of the nipple and adapted to extend over the end of said lining portion but under said outer portion of said hose, the interior of said sleeve being provided with a zone in juxtaposition to said annular section of the nipple, the surface of said zone including axially spaced circumferential regions of progressively increasing diameter towards said one end of the sleeve, one region overlying each of the cylindrical surfaces but the one of smallest diameter on said nipple and arranged to develop in cooperation therewith a plurality of axially spaced annular regions of high squeeze upon the end of said lining portion, a relieved annular portion of enlarged diameter adjacent each of said circumferential regions on the side away from said one end of the body member, the axial extent of each relieved portion being such as to extend from a point overlying one of the cylindrical surfaces on said nipple to a point overlying the cylindrical surface of next smaller diameter, a sloping annular surface contiguous with each circumferential region on the side facing said one end of the body member for easing the sleeve over the end of said lining portion, an annular surface everywhere of larger diameter than the sloping surface nearest said one end of the body member joining the latter to such sloping surface, each of the other of said sloping surfaces joining its respective circumferential region with the adjacent relieved portion, means for securing said sleeve to said opposite end of the nipple, and coupling means disposed at the other end of said sleeve.

7. A hose end fitting according to claim 6, wherein said sloping surfaces are frusto-conical in form and said relieved portions are formed by alternating frusto-conical and cylindrical surfaces.

8. A hose end fitting according to claim 6, wherein said sloping surfaces and said relieved portions are defined by smoothly blended doubly curved surfaces.

References Cited by the Examiner

UNITED STATES PATENTS

| 791,905 | 6/1905 | Higginbotham | 285—158 |
|---|---|---|---|
| 2,184,116 | 12/1939 | Eastman | 285—55 X |
| 2,289,382 | 7/1942 | Parker | 285—332.3 |
| 2,328,819 | 9/1943 | Luebkeman | 285—259 |
| 2,463,293 | 3/1949 | Mentel | 285—149 |
| 2,731,279 | 1/1956 | Main | 285—331 X |
| 2,741,496 | 4/1956 | Melsom | 285—149 |
| 2,797,474 | 7/1957 | Main | 285—149 X |
| 2,809,056 | 10/1957 | Kaiser | 285—248 X |
| 2,853,319 | 9/1958 | Press | 285—149 X |
| 3,017,203 | 1/1962 | Macleod | 285—259 X |
| 3,117,808 | 1/1964 | Swick et al. | 285—149 |
| 3,140,106 | 7/1964 | Thomas et al. | 285—149 |

FOREIGN PATENTS

| 574,071 | 4/1959 | Canada. |
|---|---|---|

CARL W. TOMLIN, *Primary Examiner.*